(12) United States Patent
Tsai et al.

(10) Patent No.: US 7,539,101 B2
(45) Date of Patent: May 26, 2009

(54) METHOD FOR DETECTING DEFECT SIGNALS ON A DISC

(75) Inventors: Chin-Yin Tsai, Taipei (TW); Shih-Fang Chen, Taipei (TW); Yi-Lin Lai, Taipei (TW)

(73) Assignee: Tian Holdings, LLC, Wilmington, DE (US)

( * ) Notice: Subject to any disclaimer, the term of this patent is extended or adjusted under 35 U.S.C. 154(b) by 710 days.

(21) Appl. No.: 11/035,043

(22) Filed: Jan. 14, 2005

(65) Prior Publication Data

US 2005/0185549 A1 Aug. 25, 2005

Related U.S. Application Data

(60) Provisional application No. 60/536,836, filed on Jan. 16, 2004.

(51) Int. Cl.
*G11B 5/09* (2006.01)
(52) U.S. Cl. ............... 369/53.17; 369/53.15; 369/47.14

(58) Field of Classification Search .............. None
See application file for complete search history.

(56) References Cited

U.S. PATENT DOCUMENTS

| 7,035,189 B2* | 4/2006 | Furumiya et al. ........ 369/59.1 |
| 2004/0059987 A1* | 3/2004 | Hung et al. ............... 714/768 |
| 2004/0179442 A1* | 9/2004 | Hyen ....................... 369/47.1 |

* cited by examiner

*Primary Examiner*—Muhammad Edun
(74) *Attorney, Agent, or Firm*—Perkins Coie LLP

(57) ABSTRACT

The present invention provides a method for detecting disk defects of a blank optical disk in a recording and reproducing system when a data-recording operation is performed. In the embodiment, an ATIP and the carrier signal of the ATIP signal, ATFM signals, are compared to obtain a difference between these two signals. A wobble defect flag signal is set if the difference keeps higher than a predetermined threshold for a predetermined time interval. On the contrary, the wobble defect flag signal is cleared if the difference keeps lower than the predetermined threshold for the predetermined time interval.

20 Claims, 1 Drawing Sheet

METHOD FOR DETECTING DEFECT SIGNALS ON A DISC

RELATED APPLICATIONS

The present application is based on, and claims priority from Provisional U.S. application Ser. No. 60/536,836, filed Jan. 16, 2004, the disclosure of which is hereby incorporated by reference herein in its entirety.

BACKGROUND OF THE INVENTION

1. Field of the Invention

The present invention relates to a recording and reproducing system, and more particularly, to a method for detecting disk defects while recording an optical disk.

2. Description of the Related Art

In recent years, disk-shaped recording media such as CD-R, CD-RW, DVD-RAM, and DVD-RW are widely used due to its high capacity storage and more and more low price. As a result, those recording and reproducing system such as CD-ROM, Combo, DVD-ROM, or DVD-RW drives become a standard computer built-in device in order to aids user to record data onto the disk-shaped recording media abovementioned.

A recordable or rewriteable optical disk may include some defects on its surface arisen from scratches, fingerprints or dusts, and some problems may be raised when recovering those data recorded on such defect areas. In order to avoid recording data in the defect areas and to maintain high recording reliability simultaneously, the recording and reproducing system usually employs protection mechanisms to prevent itself from malfunction during data-recovering operations. For example, the recording and reproducing system may scan spiral tracks in order to detect where the defect areas are before activating related recording operation. After scanning the recording tracks and labeling those disk defect areas, related protection mechanisms would be enabled thereafter. Those protection mechanisms include some well-known approaches as follows. The first approach is so-called Running OPC (Optimum Power Calibration), which dynamically modulates recording powers when tracking through those defect areas. Another approach is a defect management supported by Mountain Rainier, which setups a defect table and directs data on those defect areas toward to other correct positions. Therefore, a recording and reproducing system would effectively avoid recording errors and/or accompanying with reading failures while recovering those data recorded onto the defect areas so as to increase data-recording reliability. Obviously, the recording and reproducing system has to properly detect and label a normal area as defect because it still has to maintain high recording reliability. There is a need to disclose a method for defining or labeling where the defect areas of an optical disk are such that the sequential protection mechanisms may refers related labels during data-recording operation.

SUMMARY OF THE INVENTION

The present invention provides a method for detecting defects of an optical disk. In this embodiment, an Absolute Time in Pre-groove (ATIP) signal is taken into consideration to detect disk defects so as to provide the positions of the defect areas as reference for a recording and reproducing system.

The method for detecting disk defects of an optical disk used by a recording and reproducing system includes the steps as follows. Firstly, an ATIP signal is obtained from the optical disk. Next, the recording and reproducing system performs a frequency-modulating operation to the ATIP signal so as to derive an ATFM signal, which is a carrier signal of the ATIP signal. Thereafter, the recording and reproducing system compares the ATIP signal and the ATFM signal so as to obtain a difference between these two signals. If the difference keeps higher than a predetermined defect threshold for a predetermined defect time interval, a wobble defect flag is set to indicate where a defect level is. On the contrary, the wobble is cleared if the difference keeps lower than a normal predetermined threshold for the predetermined normal time interval.

In the embodiment, the disclosed method may be employed to scan and label all defect areas on the optical disk such that the recording and reproducing system may jump out entire defect ones or duplicate the recording data in another normal regions when the sequential protection mechanisms is actuated.

In the embodiment, the disclosed method may be employed to scan and label a defect area of the optical disk during the data-recording operation such that the recording and reproducing system may jump out entire defect ones or duplicate the recording data in another normal regions when actuating related sequential protection mechanisms.

In the embodiment, the predetermined defect threshold and the predetermined normal threshold may be defined as a unique one as applications.

In the embodiment, the predetermined defect time interval and the predetermined normal time interval may be defined as a unique one as applications.

In the embodiment, the optical disk may be a blank optical disk with no data recorded on spiral tracks, or an optical disk having data recorded on the spiral tracks.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
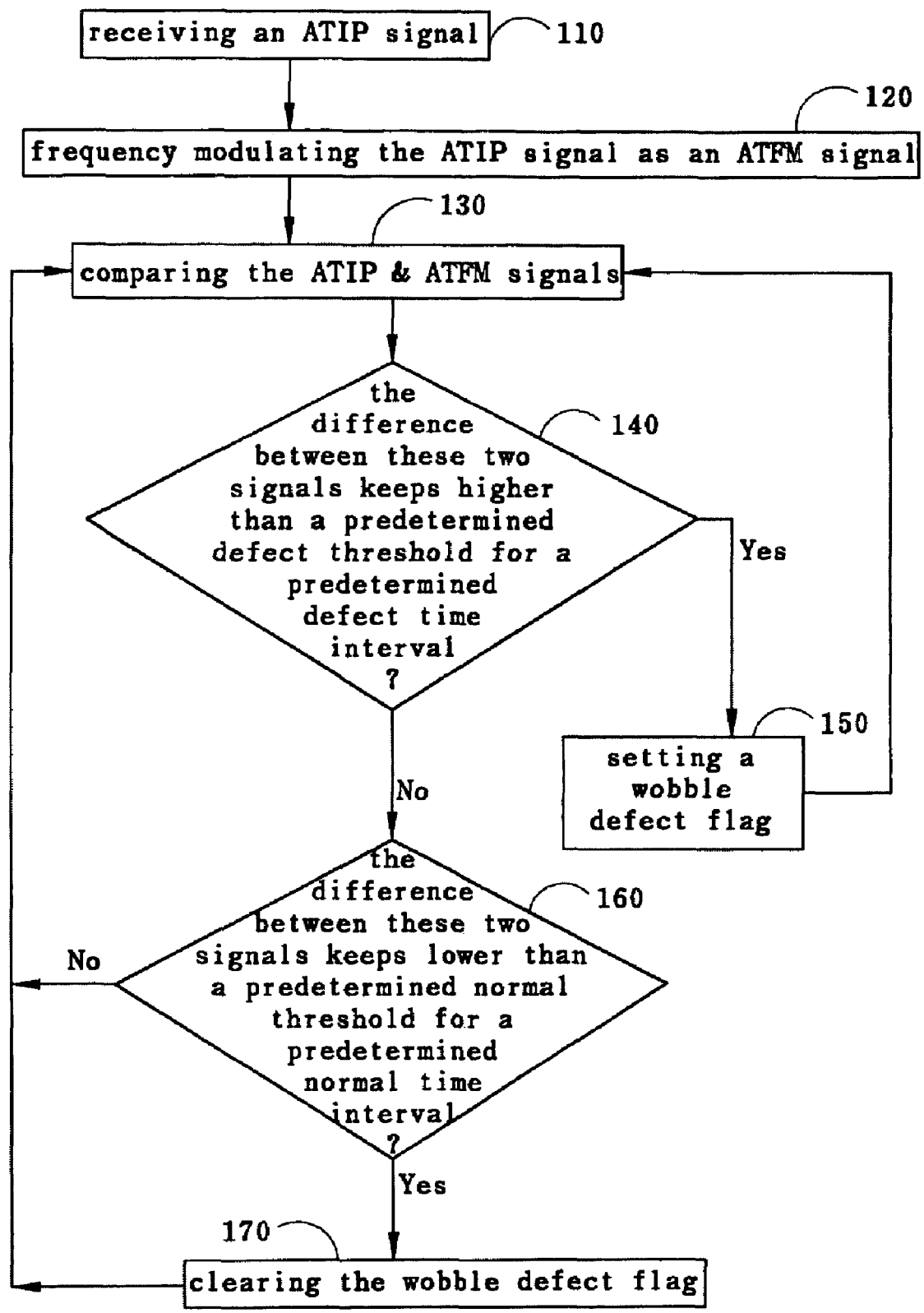
FIG. 1 shows a flowchart of detecting defect regions of the present invention.

As known by people having ordinary skill in the art, a pre-groove is previously formed on a blank optical disk to record ATIP (Absolute Time in Pre-groove) information (time information) as position references of the spiral data tracks for the recording and reproducing system. Because there is no data recorded on any spiral data tracks of the blank disk, as a result, the ATIP signal may be provided to show required timing information. The ATIP signal is a sinusoidal signal used for recording ATIP information being bi-phase modulated such that a "0" of the bi-phase code is converted to a sine wave of frequency 21.05 KHz by the frequency modulation while a "1" of the bi-phase code is convened to a sine wave of frequency 23.05 KHz by the frequency modulation. Accordingly, a recording and reproducing system has to access the ATIP signal when recording an optical disk, while this optical disk may be data-recorded only when the recording and reproducing system successfully recognizes and obtained required information from the ATIP signal. Accordingly, if there are black dots or interruptions (defects) on a blank optical disk, the ATIP signal would be dispersed and the difference between ATIP signal and an ATFM signal could be very large, wherein the ATFM signal is a carrier signal of the ATIP signal being frequency-modulated at a center frequency 22.05 kHz. As a result, the ATIP signal and the ATFM signal are taken into consideration to detect disk defects in this invention.

The method for detecting disk defects of an optical disk used by a recording and reproducing system includes the steps as follows. Please note that the optical disk loaded by the recording and reproducing system may be a blank disk or a disk having recorded thereon. Firstly, the recording and reproducing system derives the ATIP signal from a reflected optical signal when projecting a laser light beam to the blank optical disk during data-recording operation in block 110. Thereafter, the recording and reproducing system frequency-modulates the ATIP signal to derive an ATFM signal in block 120, and then compares the ATIP and the ATFM signals so as to obtain a difference between these two signals in block 130. If this difference between these two signals keeps higher than a predetermined defect threshold for a predetermined defect time interval in block 140, a wobble defect flag is then set to indicate where the defect area is in block 150. On the contrary, if the difference between these two signals keeps lower than a predetermined normal threshold for a predetermined normal time interval in block 160, the wobble defect flag is cleared for indicating a non-defect area in block 170. Normally, the difference obtained in block 130 will converge within a range defined by the predetermined defect threshold when a normal region is detected. In other words, those defect areas usually have their differences between the ATIP and ATFM signals higher than the predetermined defect threshold for a long time, which indicates that those defect areas of the optical disk may be accurately defined if the predetermined defect time interval is properly adjusted. In implementations, the absolute value of the difference may be compared with the predetermined defect threshold in block 140 as the reference for setting or clearing the wobble defect flag. Moreover, every ECC block of the optical disk may set a wobble defect flag for indicating whether an ECC block is a defect or normal one. A table may be used for storing the values of all ECC blocks for the current loaded optical disk such that the sequential protection mechanism may access flag values from this table and obtain which ECC block is defect. Resided memory, such as DRAM, or flash memory used for storing DSP code provided for servo system of the recording and reproducing system, may be used for storing this table. Please note that the table created by the disclosed method may be recorded onto corresponding optical disk as the reference of indicating the positions of the defect areas. However, a person having ordinary skills in the art may modify the embodiment, but all modifications within the spirits of the embodiment should be included in the scopes of the appended claims.

The steps from block 130 to 170 can be repeatedly performed until the currently loaded optical disk is scanned such that all defect areas can be recognized and labeled after the disclosed method terminates. The sequential protection mechanism is then performed according to the reference of the labeled defect areas. However, the disclosed method may be employed to scan and label a defect area of the loaded optical disk during the data-recording operation, while related protection mechanism is then actuated after a defect area is found. Please note that the predetermined defect/normal thresholds and defect/normal time interval could be programmed as applications. Nevertheless, these predetermined parameters should be properly adjusted because they may influence system sensitivity and then influence system stability. For example, a smaller defect threshold makes the recording and reproducing system being more sensitive to signal variations, such that some normal areas may be incorrectly determined as a defective one. Contrarily, a larger defect threshold makes the recording and reproducing system being insensitive such that the system may mistakes a defect area as a normal one. Additionally, the predetermined defect threshold and the predetermined normal threshold may be defined as a unique one as applications, while both the predetermined defect time interval and the predetermined normal one may be defined as a unique. Accordingly, the step shown in block 160 may be eliminated when unique predetermined threshold and time interval are used.

The disclosed method employs the ATIP signal and related carrier signal, the ATFM signal, to detect disk defects while recording data. As a result, those protection mechanisms could be sequentially employed to prevent data from recording onto the labeled defect areas so as to avoid recording errors. Those protection mechanisms, for examples, adjusting the recording power when passing through the defect region, avoiding data being recorded onto the defect regions, or so-called defect management approach as aforementioned, may be sequentially used to avoid malfunction during a data-recording operation.

Please note that the disclosed method may be employed to scan and label all defect areas on the optical disk such that the recording and reproducing system may jump out these defective ones or duplicate the recording data in other normal regions when the sequential protection mechanism is actuated. On the other hand, the disclosed method may be employed to scan and label a defect area of the optical disk during the data-recording operation such that the recording and reproducing system may jump out these defective ones or duplicate the recording data in other normal regions when actuating related sequential protection mechanisms. A person having ordinary skills of the art may modify the embodiment as applications, but all similar variations or modifications within the spirits of the embodiment should be included in the scopes of the appended claims.

As the description above, the present invention provides a method for detecting disk defects of an optical disk for a recording and reproducing system when performing recording operations. In the invention, the ATIP and ATFM signals are compared, and a wobble defect flag is set with respect to their comparison result. As a result, the defect area of the optical disk could be recognized.

Finally, those skilled in the art should appreciate that they can readily use the disclosed conception and specific embodiment as a basis for designing or modify other structures for carrying put the same purpose of the present invention without departing from the spirits and scope of the invention as defined by the appended claims.

What is claimed is:

1. A method for detecting defect areas of an optical disk in a recording and reproducing system, the method comprising:
   receiving a first reference signal;
   receiving a second reference signal; and
   comparing the first and the second reference signal;
   wherein a third reference signal is set if a difference between the first and the second reference signal is greater than a predetermined threshold for a predetermined time interval, and wherein the second reference signal is a carrier signal of the first reference signal.

2. The method of claim 1 wherein the first reference signal is an ATIP (Absolute Time in Pre-groove) signal.

3. The method of claim 1 wherein the third reference signal is a wobble defect signal.

4. The method of claim 1 wherein the third reference signal is cleared if the third reference signal is set and the difference between the first and the second reference signal is lower than said predetermined threshold and for the predetermined time interval.

5. The method of claim 1, wherein the recording and reproducing system is an optical disk drive that invokes the method.

6. A method for detecting defect areas of an optical disk in a recording and reproducing system, the method comprising:
   comparing an ATIP (Absolute Time in Pre-groove) signal with an ATFM signal to obtain a difference of the ATIP signal and the ATFM signal, wherein the ATFM signal is a carrier signal of the ATIP signal;
   setting a defect signal if a difference is greater than a predetermined threshold for a predetermined time interval; and
   clearing a defect signal if a difference is lower than the predetermined threshold for the predetermined time interval.

7. The method of claim 6 wherein the recording and reproducing system is a CD-RW, a DVD+RW, a DVD−RW, a CD−MRW, or a DVD−MRW drive.

8. The method of claim 1 wherein the carrier signal is frequency modulated at a center frequency of 22.05 kHz.

9. The method of claim 6 wherein the defect signal is a wobble defect signal of an optical disk drive.

10. An optical disk recording and reproducing system, comprising:
    a component that derives an absolute time in pre-groove (ATIP) signal based on a received optical disk;
    a component that derives a carrier signal of the ATIP signal; and
    a component that compares the ATIP signal and the carrier signal, and sets a defect signal if a difference between the ATIP signal and the carrier signal remains greater than a first specified threshold for a first specified time interval.

11. The optical disk recording and reproducing system of claim 10, wherein the received optical disk has no data recorded on its spiral tracks.

12. The optical disk recording and reproducing system of claim 10 further comprising a component that labels defective areas of the optical disk.

13. The optical disk recording and reproducing system of claim 12 further comprising a component that avoids areas of the optical disk that are labeled as defective.

14. The optical disk recording and reproducing system of claim 13 further comprising a component that duplicates recording data in a region of the optical disk that is not labeled as defective.

15. The optical disk recording and reproducing system of claim 10, wherein the defect signal is a wobble defect flag.

16. The optical disk recording and reproducing system of claim 10, wherein the first specified threshold is a defect threshold.

17. The optical disk recording and reproducing system of claim 10 further comprising a component that clears the defect signal if the difference between the ATIP signal and the carrier signal remains lower than a second specified threshold for a second specified time interval.

18. The optical disk recording and reproducing system of claim 17, wherein the second specified threshold is a normal threshold.

19. The optical disk recording and reproducing system of claim 10 further comprising a component that stores locations of defective blocks of the optical disk.

20. The optical disk recording and reproducing system of claim 10 further comprising a component that scans and labels defective areas of the optical disk during a data recording operation.

* * * * *